United States Patent [19]

Weyersbach et al.

[11] Patent Number: 5,389,394
[45] Date of Patent: Feb. 14, 1995

[54] PROCESS FOR PRODUCING COCOA EXTRACT

[75] Inventors: Bernd Weyersbach, Ganderkesee; Ortwin Culmsee, Bremen, both of Germany

[73] Assignee: Jacobs Suchard AG, Zurich, Switzerland

[21] Appl. No.: 506,079

[22] Filed: Apr. 9, 1990

[30] Foreign Application Priority Data

Apr. 19, 1989 [DE] Germany .................. 3912819

[51] Int. Cl.$^6$ .................. A23L 2/38; A23G 1/00
[52] U.S. Cl. .................. 426/593; 426/631
[58] Field of Search .................. 426/593, 631, 330

[56] References Cited

U.S. PATENT DOCUMENTS

| | | | |
|---|---|---|---|
| 2,512,663 | 6/1950 | Masurovsky . | |
| 2,957,769 | 10/1960 | Rusoff | 426/593 |
| 4,224,354 | 9/1980 | Szegvari | 426/593 |
| 4,349,579 | 9/1982 | Raboud | 426/631 |
| 4,758,444 | 7/1988 | Terauchi | 426/593 |
| 4,784,866 | 11/1988 | Wissgot | 426/593 |
| 4,871,562 | 10/1989 | Tarauchi | 426/593 |

FOREIGN PATENT DOCUMENTS

| | | |
|---|---|---|
| 3131530 | 6/0982 | Germany . |
| 2342177 | 7/1974 | Germany . |
| 1195634 | 6/1970 | United Kingdom . |

OTHER PUBLICATIONS

Patent Abstracts of Japan, JP-A-61239872, Band 11, Nr. 85, Mar. 14, 1987.
Patent Abstracts of Japan, JP-A-6322146, Band 12, Nr. 230, Jun. 29, 1988.

*Primary Examiner*—Carolyn Paden
*Attorney, Agent, or Firm*—Burns, Doane, Swecker & Mathis

[57] ABSTRACT

The invention relates to a process for producing cocoa extract which involves the extraction of cocoa with water and the separation of aqueous extract and extracted cocoa, the starting material used being broken cocoa seeds which are extracted with water in a static fixed bed at a temperature of between 40° C. and 100° C.

10 Claims, 2 Drawing Sheets

PROCESS FOR PRODUCING COCOA EXTRACT

BACKGROUND OF THE INVENTION

1. Field of the Invention

The invention relates to a process for producing cocoa extract, in which cocoa is subjected at relatively high temperature to extraction with water and then the aqueous extract on the one hand and the cocoa freed of water-soluble constituents on the other hand are separated from one another.

2. Description of Related Art

German Offenlegungsschrift 2,342,177 discloses a process for cocoa treatment, in which an aqueous extract is obtained from cocoa fragments. For this, cocoa fragments consisting of unroasted beans are subjected to an extraction operation with water at a temperature of 70° C. to 135° C. Since cocoa fragments have a relatively high fat content (approximately 60% by weight) and cocoa butter becomes molten at approximately 30° C., fat can easily pass into the extract. In one embodiment of the process according to German Offenlegungsschrift 2,342,177, the formation of a fat emulsion can be prevented by starting the extraction at a high temperature and continuing it at decreasing temperatures. In an extraction process, maintaining to differing temperatures requires measures involving a relatively high outlay. In German Offenlegungsschrift 2,342,177, drastic conditions, such as working under pressure and high temperatures are provided for the process described, in order to obtain a satisfactory yield. These conditions can lead to undesirable reactions of cocoa constituents and release undesirable constituents from the cocoa.

SUMMARY OF THE INVENTION

Starting from the foregoing state of the art, the object of the invention is to provide a process for producing cocoa extract, by which a water-soluble virtually fat-free extract with improved organoleptic and practical properties can be produced, specifically at the same time avoiding pressure and mechanical loads.

According to the invention, this object subject is achieved by means of the process claimed.

DESCRIPTION OF THE PREFERRED EMBODIMENTS

According to the present invention, broken cocoa seeds are extracted with water in a static fixed bed at a temperature of between 40° C. and 100° C., especially at 70° C.

It has been shown, surprisingly, that by the extraction of broken cocoa seeds, that is to say cocoa nibs, in a static fixed bed at a temperature in the range of between 40° C. and 100° C. a fat-free cocoa extract can be produced. It is especially important that the broken cocoa seeds not be exposed during extraction to any mechanical loads, such as are caused, for example, in extraction devices with an agitator, screw, etc.

It is especially important that the process according to the invention be carried out at atmospheric pressure. This affords an advantage over all known processes. The water is preferably conveyed through the broken cocoa seeds from the top downwards.

The broken cocoa seeds can be pre-swollen before the actual extraction in water. More advantageously, however, the swelling operation is integrated into the extraction process, according to the invention the broken cocoa seeds being made to swell by means of extract-containing water. This leads to an increase in the extract yield and to a shortening of the extraction time.

Figure 1:
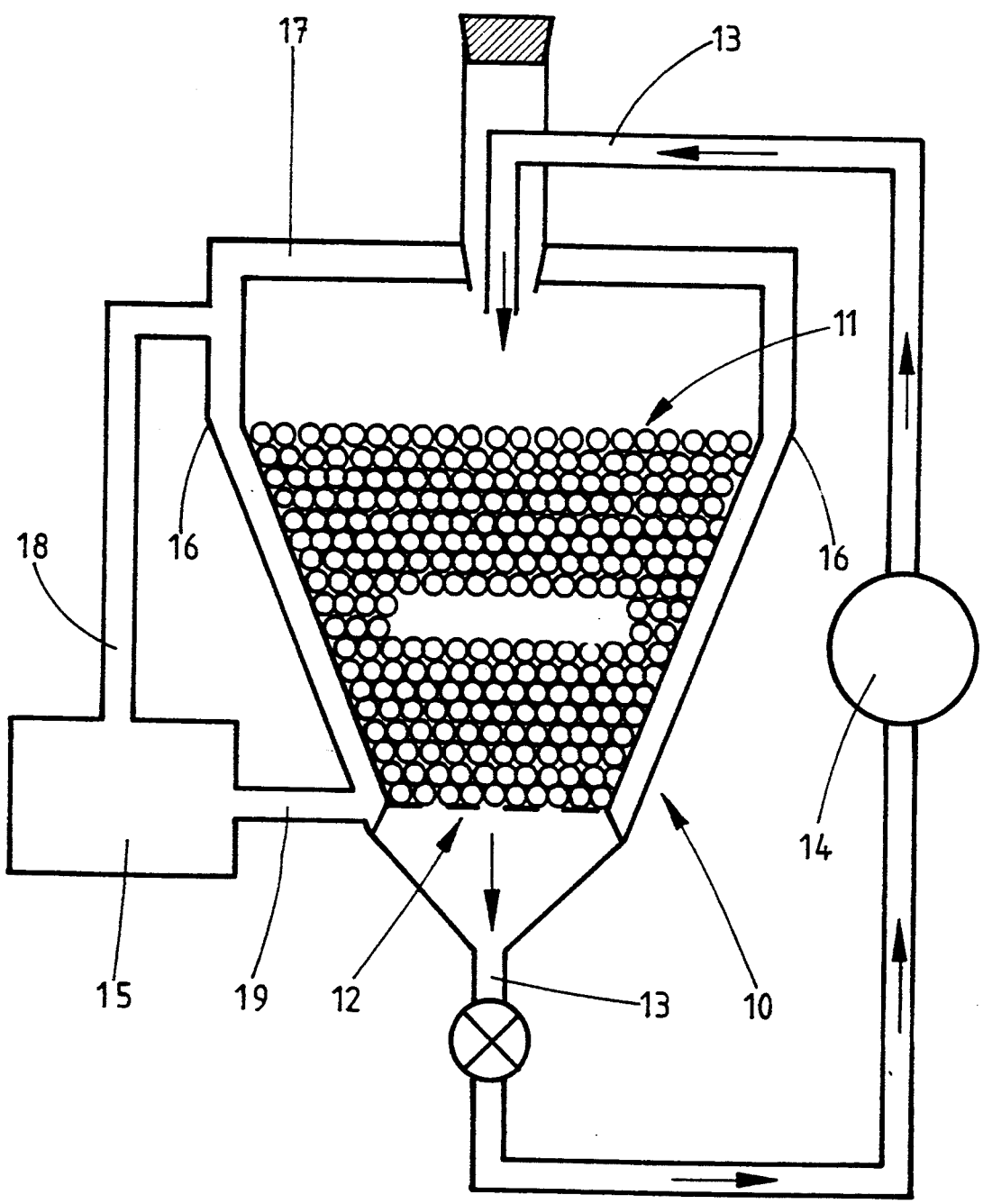
FIG. 1 is a diagram showing an arrangement for carrying out the process of the invention.

An appliance for carrying out the process according to the invention is illustrated diagrammatically in FIG. 1. A conical funnel-shaped column 10 contains a batch of broken cocoa seeds 11 as a fixed bed. The column 10 is equipped in the lower region with a sieve bottom or slotted frit 12. Underneath the slotted frit 12, the column 10 narrows sharply and opens into a line 13, in which aqueous extract is conveyed by means of a pump 14. The line 13 terminates in the upper region of the column 10 and there is preferably equipped with a nozzle which can spray water or aqueous extract onto the broken cocoa seeds. The walls 16 of the column 10 are made double-walled in the region above the slotted frit. The cavity 17 so formed is filled with a heating medium, for example water. The heating medium is supplied or discharged via lines 18 and 19. The temperature of the heating medium can be regulated by means of a thermostat 15.

To carry out the process according to the invention, the broken cocoa seeds 11 in the column 10 are sprinkled with water which is conveyed into the column through the line 13. The water flows through the broken cocoa seeds and absorbs cocoa ingredients. The aqueous extract solution thus obtained passes out of the column through the slotted frit 12, enters the line 13 and is transported into the upper region of the column 10 by means of the circulating pump 14 and applied to the broken cocoa seeds. The temperature during extraction is maintained at a value of between 40° C. and 100° C.

The process according to the invention, especially in the above-described embodiment of the process, is explained in detail below by means of an example.

EXAMPLE 1

250 g of cocoa nibs (broken cocoa seeds, 2% water) are poured into a conical funnel-shaped column and extracted with 750 g of water at 73° C. for 2.5 hours.

After extraction has ended, there are the following:

543.3 g aqueous cocoa extract with
23.1 g dissolved cocoa extract substances (=an extract concentration of 4.25%)
456.7 g leached-out aqueous broken cocoa seeds consisting of
234.8 g water and
221.9 g dry substance The yield of cocoa extract substances from the cocoa nibs used is 9.2%.

An increase in the extract yield can be obtained by making the process continuous with a plurality of columns connected in series and through which the extract material and water flow in counter flow.

Advantages in process terms in carrying out the process according to the invention are afforded by the use of a so-called revolving extractor which constitutes a percolating apparatus working continuously on the counter flow principle.

Figure 2:
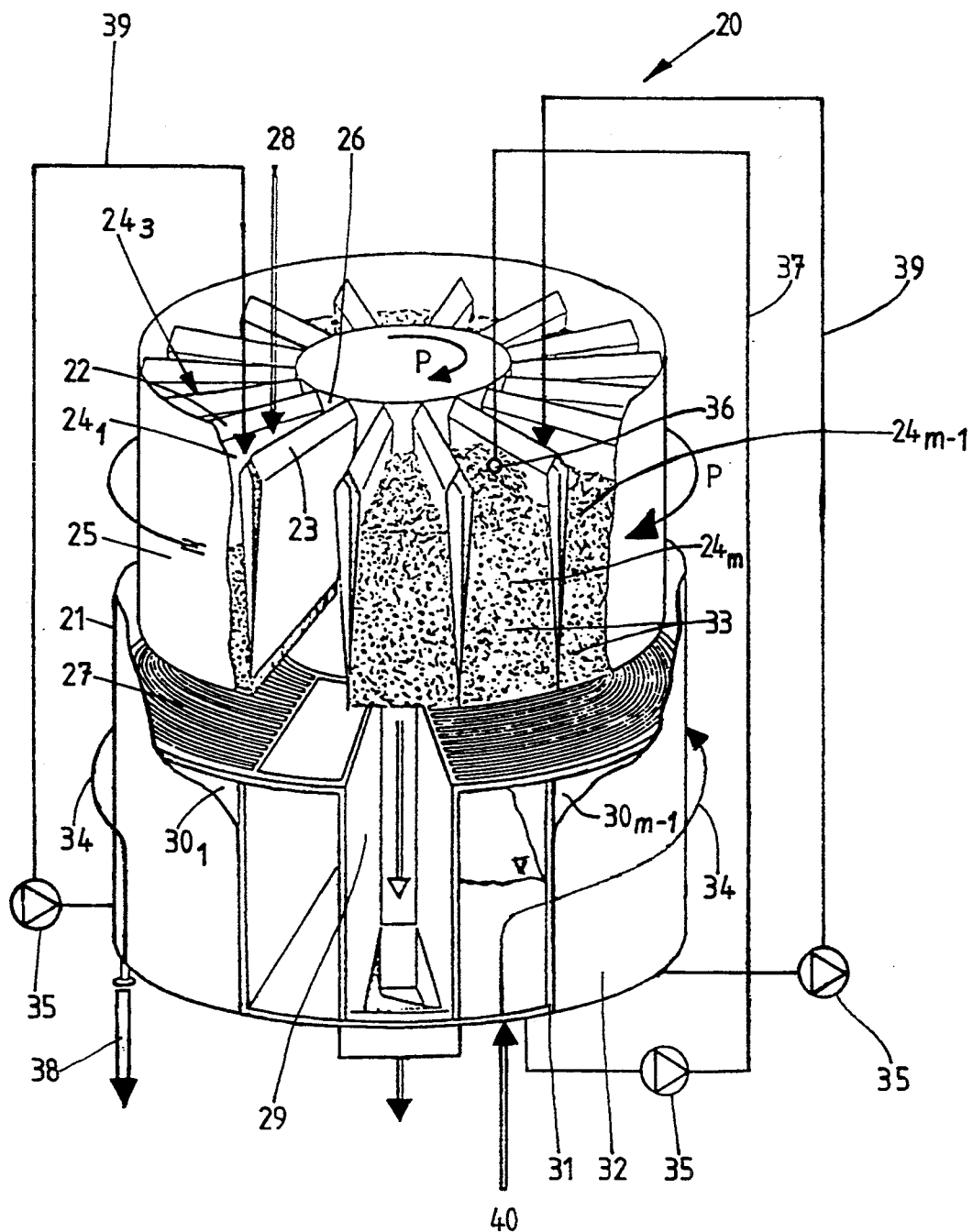
FIG. 2 is a diagrammatic perspective view of a revolving extractor which can be used to practice the process of the invention.

FIG. 2 shows a diagrammatic perspective representation of a revolving extractor. The invention is explained in detail in an embodiment especially suitable in process terms by reference to FIG. 2.

As is evident from FIG. 2, a revolving extractor 20 comprises a housing 21, in which is arranged a plurality of cell walls which extend radially from a common axle and of which only two cell walls are identified by the reference numerals 22 and 23 in FIG. 2. These cell walls 22 and 23 form divergent side walls of a first cell $24_1$ which is also limited by an outer wall 25 and an inner wall 26. The stationary slotted bottom 27 is permeable to liquid, the slots being matched in their dimensions to the extraction material.

Underneath the stationary slotted bottom 27 there are collecting chambers $30_1$, etc, the total number of which corresponds to that of the cells $24_1$ etc. The collecting chambers 30 are equipped with partition walls 31 and have a common outer wall 32.

A plurality of extraction cells with collecting chambers located under them follow the cell $24_1$ shown in FIG. 2, with the chamber $30_1$. The extraction cells are each equipped with a sprinkling device consisting of a pump 35, a line 39 (shown only for the cell $24_1$ in FIG. 2), a heat exchanger and a spray head (not shown). Located in the collecting chamber is a valve which is controlled by a float and which is connected to the pump 35 and to a counter flow line 34. The counter flow line 34 opens into the respective preceding collecting chamber. Thus, for example, the counter flow line 34 of the chamber $30_4$ opens into the chamber $30_3$, and so forth. This arrangement generates a liquid flow which on the one hand constitutes a crossflow via the sprinkling device and on the other hand includes a counter flow directed opposite to the transport direction of the cells 24 (arrow p in FIG. 2). The last extraction cell $24_{m-1}$ can be followed by a so-called washing cell $24_m$, above which is arranged a spray head 36 which is connected to a washing-water line 37 via a valve.

After the washing cell $24_m$, the bottom 27 has a discharge cutout 29, so that, during the further transport of the cells, the cell content can fall downwards through this cutout 29 into a discharge and be conveyed away.

In detail, the process proceeds as follows:

The broken cocoa seeds 33 supplied to the revolving extractor 20 via an infeed 28 are pre-swollen in the first cell $24_1$. The revolving extractor is subsequently driven in rotation. The cells are thereby shifted further at a specific stroke by the amount of a chamber width or cell width each time. The broken cocoa seeds located in the washing cell $24_m$ are sprayed with fresh water which enters the collecting chamber located underneath. As a result of the addition of liquid, the liquid level in the last collecting chamber rises to a level at which the associated valve is opened and liquid is conveyed into the collecting chamber $30_{m-1}$ located in front. At the same time, the liquid contained in the chamber is conveyed to the spray head 36 by means of the pump 35 and sprinkles the quantity of broken cocoa seeds located in the chamber $24_{m-1}$. The delivery of the pump 35 is controlled in such a way that the sprinkling or recirculation quantity is lower than the percolation rate.

The level settings in the collecting chambers assigned to the preceding extraction cells produce a liquid flow, the liquid having an extract concentration increasing from chamber to chamber. Thus, an extract solution with a maximum extract content is located in the first collecting chamber $30_1$ (FIG. 2), the liquid level in the first chamber $30_1$ being maintained constant by the valve controlled by the float, since, with an increasing level, an extract quantity corresponding to the quantity of liquid supplied is discharged via the line 38.

Shortly before the end of the cycle time, all the pumps 35 are stopped, and the level setting in the collecting chambers is deactivated. The entire quantity of liquid in each stage is thus collected in the respective collecting chamber. After the drip-off of the liquid which lasts an adjustable time, the drive of the extractor is switched on again and the cells are moved further by the amount of one chamber. During the standstill time of the pumps 35, the valve for regulating the supply of washing water is switched off. When the cells have reached their new position, all the pumps 35 are switched on again, the level setting initially being kept ineffective.

The following Example 2 illustrates the claimed process carried out in a revolving extractor:

EXAMPLE 2

| Operation of the revolving extractor | |
| --- | --- |
| Water supply | 42.5 kg/h |
| Filling per cell | 7.5 kg broken cocoa seeds (with 2% water) |
| Cycle time | 45 minutes |
| Extraction temperature | 73° C. |
| Process duration | 41.4 hours (without a run-in and run-out phase) |

EXTRACTION RESULT 34.2 kg/h aqueous cocoa extract with 1.4 kg dissolved cocoa extract substances 18.3 kg/h leached-out aqueous broken cocoa seeds consisting of 9.9 kg water and 8.4 kg dry substance.

The concentration of the aqueous extract obtained amounts to 4.8%. The yield of extract substances is around 14.0%.

The aqueous solution of cocoa ingredients which is obtained during extraction is preferably concentrated. This is carried out by using processes known per se, such as the vacuum evaporation of the solvent, freeze-drying, spray-drying. At the same time, the water-soluble extract can be changed to a concentrated aqueous form or to a powder form. The extract produced according to the invention is suitable for the production of instant and ready-made beverages and as an aromatic and/or colorant for confectionery articles.

The extracted broken cocoa seeds can be supplied for further use preferably after drying. For example, they are suitable for obtaining a special cocoa mass and/or cocoa butter.

We claim:

1. A process for producing cocoa extract comprising contacting broken cocoa seeds with water at a temperature in the range of between 40° and 100° C. and atmospheric pressure in a static fixed bed extractor wherein the water flows downward through the fixed bed extractor so as to obtain an aqueous extract containing the water-soluble constituents of the cocoa seeds and the residue of the broken cocoa seeds and recovering the aqueous extract.

2. The process of claim 1 wherein the broken cocoa seeds are comprised of cocoa nibs having a particle size of approximately 5 to 8 mm in diameter and cocoa powder.

3. The process of claim 1 wherein the broken cocoa seeds are swollen with water before or at the start of the extraction.

4. The process of claim 1 wherein the fixed bed extractor is a plurality of columns connected in series and counter flow extraction is conducted.

5. The process of claim 1 wherein the aqueous extract is concentrated.

6. The process of claim 1 wherein subsequent to extraction, the residue of the broken cocoa seeds are dried.

7. An instant or ready-made cocoa-flavored beverage wherein the improvement comprises said beverage comprised of the aqueous extract produced by the process of claim 1.

8. An additive which is at least one of a colorant or aromatic ingredient wherein the improvement comprises said additive comprised of the aqueous extract produced by the process of claim 1.

9. A product selected from cocoa mass and cocoa butter wherein the improvement comprises said product comprised of the residue of the broken cocoa seeds produced by the process of claim 1.

10. The process of claim 1 wherein the aqueous extract is substantially fat-free.

* * * * *